United States Patent
Lee et al.

(10) Patent No.: US 10,421,223 B2
(45) Date of Patent: Sep. 24, 2019

(54) APPARATUS AND METHOD FOR MANUFACTURING PERMANENT MAGNET

(71) Applicant: HYUNDAI MOTOR COMPANY, Seoul (KR)

(72) Inventors: Jae Ryung Lee, Hwaseong-si (KR); Hyung Ju Lee, Gimhae-si (KR); Kun Min Park, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 477 days.

(21) Appl. No.: 15/175,542

(22) Filed: Jun. 7, 2016

(65) Prior Publication Data

US 2017/0151697 A1   Jun. 1, 2017

(30) Foreign Application Priority Data

Dec. 1, 2015 (KR) .................. 10-2015-0170018

(51) Int. Cl.
| | |
|---|---|
| *B29C 45/14* | (2006.01) |
| *H01F 7/02* | (2006.01) |
| *H01F 1/053* | (2006.01) |
| *H01F 41/02* | (2006.01) |
| *B29L 31/00* | (2006.01) |
| *B29K 105/20* | (2006.01) |

(52) U.S. Cl.
CPC .. *B29C 45/14467* (2013.01); *B29C 45/14778* (2013.01); *H01F 1/0533* (2013.01); *H01F 7/02* (2013.01); *H01F 41/0253* (2013.01); *B29C 2045/1454* (2013.01); *B29K 2105/203* (2013.01); *B29K 2995/0008* (2013.01); *B29L 2031/00* (2013.01)

(58) Field of Classification Search
CPC ........ B29C 45/14467; B29C 45/14778; B29C 2045/1454; H01F 7/02; H01F 1/0533; H01F 41/0253; B29K 2105/203; B29K 2995/0008; B29L 2031/00
See application file for complete search history.

(56) References Cited

FOREIGN PATENT DOCUMENTS

| | | |
|---|---|---|
| JP | H07-079537 A | 3/1995 |
| JP | 2002-248425 A | 9/2002 |
| JP | 2004-241418 A | 8/2004 |
| JP | 2004-328927 A | 11/2004 |
| JP | 2005-209947 A | 8/2005 |
| JP | 2014-093874 A | 5/2014 |
| KR | 20-1999-0023363 U | 7/1999 |
| KR | 10-0835558 B1 | 6/2008 |
| KR | 10-2009-0062430 A | 6/2009 |
| KR | 10-2014-0115738 A | 10/2014 |

OTHER PUBLICATIONS

Korean Notice of Allowance issued in Application No. 10-2015-0170018 dated Jun. 1, 2017.

*Primary Examiner* — Robert J Grun
(74) *Attorney, Agent, or Firm* — Morgan, Lewis & Bockius LLP

(57) ABSTRACT

A method for manufacturing a permanent magnet includes preparing a plurality of permanent magnet blocks having the same size, spacing and arranging the plurality of permanent magnet blocks in a lower mold Having an opened upper side, pressing a side of the lower mold while circulating adhesive in the lower mold and integrating the plurality of permanent magnet blocks such that the adhesive is evenly applied to surface of each of the permanent magnet blocks, thereby forming a permanent magnet assembly and hardening the adhesive by heating the permanent magnet assembly.

15 Claims, 3 Drawing Sheets

[FIG.1]
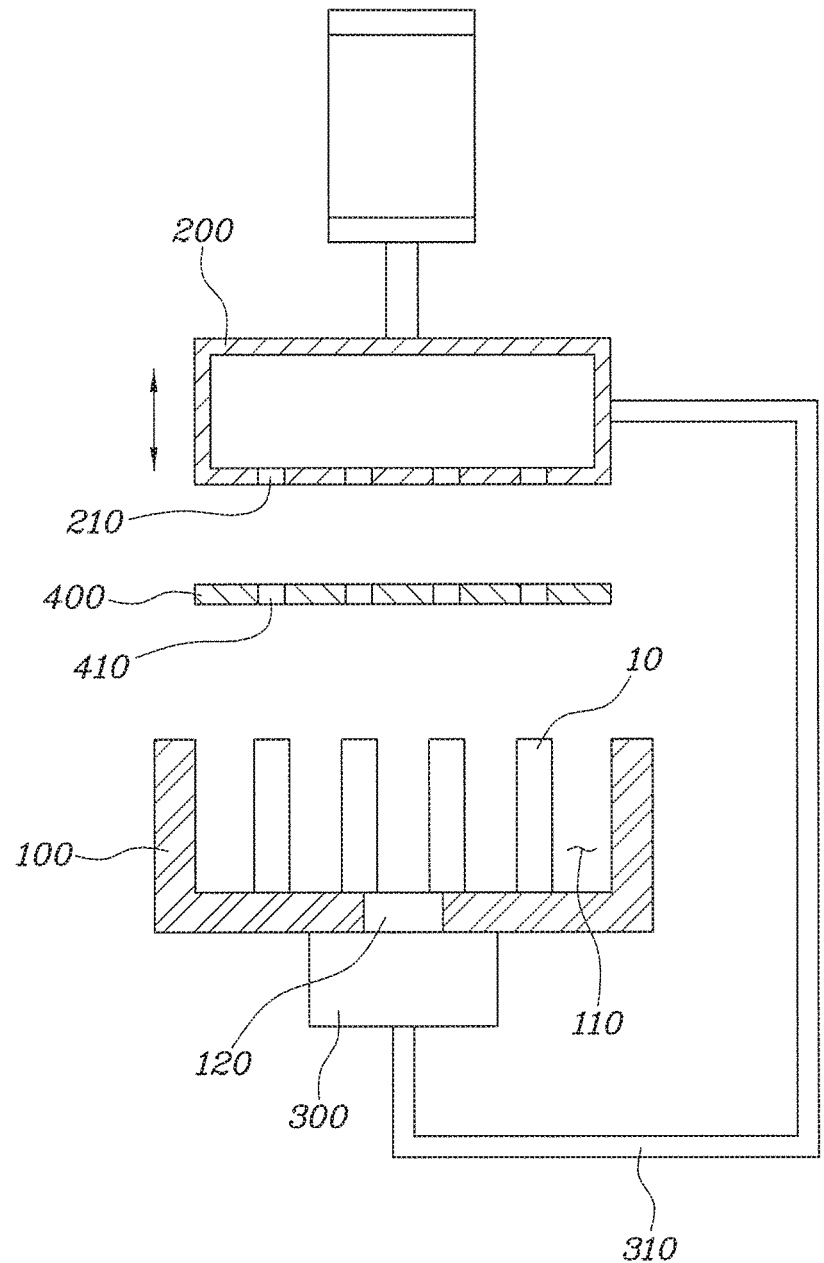

[FIG.2]
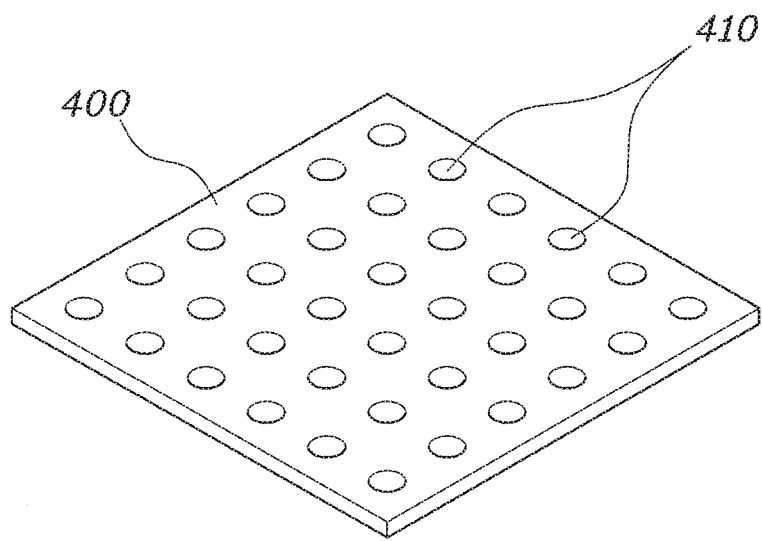
[FIG.3]
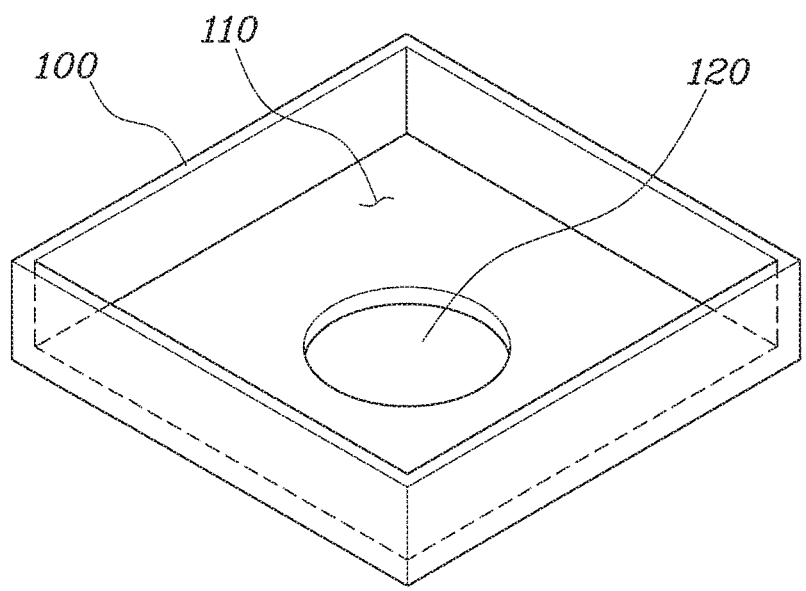

[FIG.4]
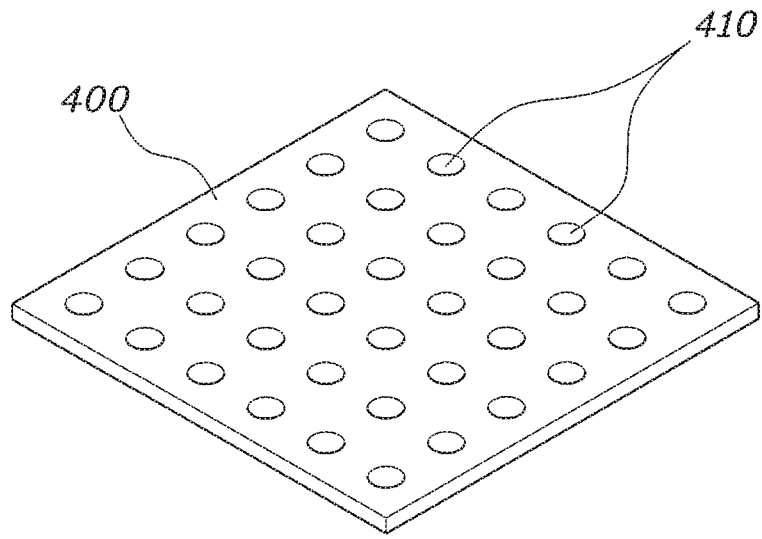
[FIG.5]
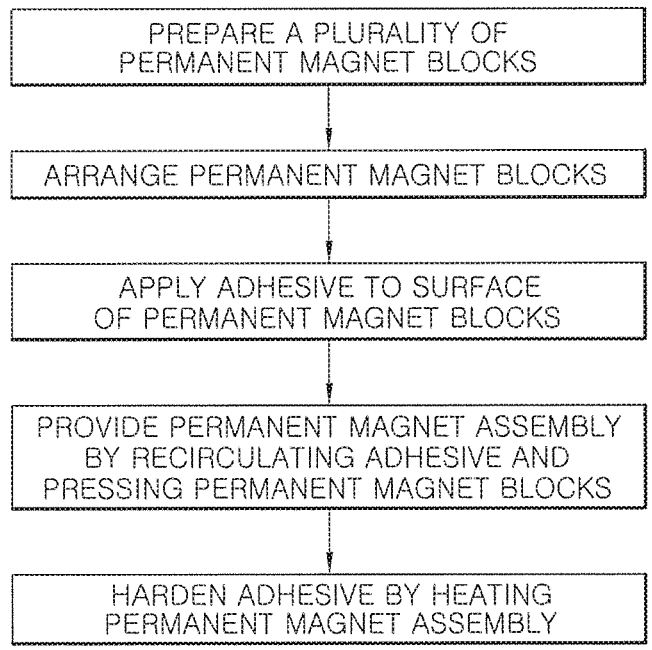

APPARATUS AND METHOD FOR MANUFACTURING PERMANENT MAGNET

CROSS REFERENCE TO RELATED APPLICATION

The present application claims the benefit of priority to Korean Patent Application No. 10-2015-0170018 filed on Dec. 1, 2015, the entire content of which is incorporated herein for all purposes by this reference.

TECHNICAL FIELD

The present disclosure relates to an apparatus for manufacturing a permanent magnet inserted into a rotor of a electric motor, and a method for manufacturing a permanent magnet using the same. More particularly, the present disclosure relates to an apparatus and a method for manufacturing a permanent magnet in which a permanent magnet manufacturing process can be simplified.

BACKGROUND

In a broad sense, hybrid vehicles refer to vehicles drive by two or more different types of power sources which are efficiently combined. In general, the hybrid vehicles drive by an engine and an electric motor, and they are called hybrid electric vehicles (HEVs).

In recent years, in order to improve fuel efficiency and develop eco-friendly vehicles, studies on hybrid vehicles are actively ongoing.

Such hybrid vehicles include an engine and an electric motor as power sources. The electric motor is driven by electric power supplied from a battery mounted in the vehicle and includes main components, such as a stator configured to wind a coil around a stator core and a rotor disposed inside the stator, similar to a conventional motor. The rotor includes a permanent magnet into a rotor core.

As such, the electric motor in the hybrid vehicles requires a high-performance permanent magnet in order to obtain high power and high efficiency.

Accordingly, rare-earth permanent magnets having 3 to 5 times stronger magnetic force than ferrite magnets are used in a related art in order to reduce motor weight and improve vehicle efficiency.

However, since such a rare-earth permanent magnet has high conductivity and low specific resistance, eddy currents are generated in the permanent magnet, resulting in an increase in temperature of the permanent magnet. The increase in temperature of the permanent magnet leads to a reduction in magnetic flux density or irreversible demagnetization of the permanent magnet, thereby causing fatal deterioration of motor performance.

In order to resolve these problems, when heavy rare-earth elements resistant to heat are added to a permanent magnet, the manufacturing costs of the permanent magnet may increase, and the amount of rare-earth element preserves is not sufficient compared to other metals.

Accordingly, techniques for decreasing eddy current paths and reducing a loss (iron loss) by manufacturing permanent magnets which are divided axially or laterally have been developed.

However, these techniques increase man-hour since bonding layers are formed on bonding surfaces of the permanent magnets and deteriorate productivity since post-treatment processes such as surface grinding for adjusting flatness and surface coating for improving corrosion resistance are required after bonding the permanent magnets.

In addition, the permanent magnets may be broken at their corners during the surface grinding thereof, thus deteriorating production qualities of the permanent magnets.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure provides an apparatus capable of manufacturing a permanent magnet having high corrosion resistance while minimizing an increase in temperature due to an eddy current, and a method for manufacturing the permanent magnet using the same.

In addition, the present disclosure provides an apparatus and a method for manufacturing a permanent magnet in which a permanent magnet manufacturing process can be simplified by simultaneously bonding and coating permanent magnet blocks, and manufacturing costs can be reduced.

Furthermore, the present disclosure is intended to propose an apparatus and method for manufacturing a permanent magnet in which a consumption amount of adhesive can be minimized.

In accordance with one embodiment in the present closure, a method for manufacturing a permanent magnet includes preparing a plurality of permanent magnet blocks having the same size, spacing and arranging the plurality of permanent magnet blocks in a lower mold having an opened upper side, pressing a side of the lower mold while circulating adhesive in the lower mold and integrating the plurality of permanent magnet blocks such that the adhesive is evenly applied to a surface of each of the permanent magnet blocks, thereby forming a permanent magnet assembly and hardening the adhesive by heating the permanent magnet assembly.

The step of pressing the side of the lower mold may include arranging a leveling plate on the opened upper side of the lower mold, and pressing the leveling plate using an upper mold to level the plurality of permanent magnet blocks.

The lower mold may have an adhesive collection hole formed on a bottom side of the lower mold, the upper mold may have a plurality of adhesive spray holes formed on a bottom side of the upper mold such that the adhesive accommodated in the upper mold is sprayed through the adhesive spray holes. In the step of pressing the side of the lower mold, the permanent magnet blocks may be integrated while the adhesive in the lower mold is introduced through the adhesive collection hole and flows back to the upper mold.

In the step of pressing the side of the lower mold, the adhesive may recirculate such that a bonding layer on each of the plurality of permanent magnet blocks has a thickness of 10 μm to 50 μm.

Each of the upper and lower molds may be made of a rubber material, and in the step of pressing the side of the lower mold, the same force may be applied to the plurality of permanent magnet blocks in all directions.

The method may further include, before the spacing and arranging the permanent magnet blocks, applying the adhesive to an inner wall of the lower mold.

The adhesive may be a thermosetting resin.

In accordance with another embodiment in the present disclosure, an apparatus for manufacturing a permanent magnet includes: a lower mold having an inner space in which a plurality of permanent magnet blocks are disposed, having an enclosed shape that opened at an upper side of the lower mold, and having an adhesive collection hole formed on a bottom side of the lower mold; an upper mold vertically movably disposed above the lower mold; adhesive being sprayed to the inner space of the lower mold through a plurality of adhesive spray holes formed on a bottom side of the upper mold while the upper mold is inserted through the opened upper surface of the lower mold and presses upper surfaces of the plurality of permanent magnet blocks; and an adhesive recirculation unit attached on the bottom side of the lower mold such that the adhesive accommodated in the lower mold is introduced through the adhesive collection hole and flows back to the upper mold through an adhesive passage.

Each of the upper and lower molds may be made of a rubber material such that the same force is applied to the permanent magnet blocks in all directions.

Each of the adhesive spray holes may have a diameter of 40 µm to 60 µm.

The apparatus may further include a leveling plate inserted through the opened upper side of the lower mold and having a plurality of adhesive flow holes such that the adhesive flows through the adhesive flow holes.

As apparent from the above description, in accordance with the embodiments in the present disclosure, since the permanent magnet is manufactured by bonding a plurality of permanent magnet blocks, it is possible to remove a surface grinding process for improving flatness of the magnet and a coating process for improving corrosion resistance of the magnet. Therefore, it is possible to simplify manufacturing processes, shorten manufacturing times, improve productivity, and reduce manufacturing costs.

In addition, since the adhesive are recirculated/reused and evenly applied to the surface of the permanent magnet, it is possible to manufacture the permanent magnet having high performance while the corrosion resistance of the magnet is improved and the used amount of adhesive is minimized.

BRIEF DESCRIPTION OF THE DRAWINGS

The above and other objects, features and advantages of the present disclosure will be more clearly understood from the following detailed description taken in conjunction with the accompanying drawings.

FIG. 1 is a view illustrating an apparatus for manufacturing a permanent magnet according to an embodiment in the present disclosure.

FIG. 2 is a perspective view illustrating an upper mold according to an embodiment in the present disclosure.

FIG. 3 is a perspective view illustrating a lower mold according to an embodiment in the present disclosure.

FIG. 4 is a view illustrating a leveling plate according to an embodiment in the present disclosure.

FIG. 5 is a flowchart illustrating a method for manufacturing a permanent magnet according to an embodiment in the present disclosure.

DETAILED DESCRIPTION

The exemplary embodiments in the present disclosure will be described below with reference to the accompanying drawings. The present disclosure may, however, be embodied in different forms and should not be construed as limited to the embodiments set forth herein. Throughout the disclosure, like reference numerals refer to like parts throughout the various figures and embodiments in the present disclosure. The drawings are not necessarily to scale and in some instances, proportions may have been exaggerated in order to clearly illustrate features of the embodiments.

In the present disclosure, since a permanent magnet is manufactured by simultaneously bonding and coating a plurality of permanent magnet blocks, it is possible to simplify the manufacturing process of the permanent magnet, improve the performance thereof by minimizing the used amount of adhesive, and reduce manufacturing costs.

FIG. 1 is a view illustrating an apparatus for manufacturing a permanent magnet according to an embodiment in the present disclosure. FIG. 2 is a perspective view illustrating an upper mold according to an embodiment in the present disclosure. FIG. 3 is a perspective view illustrating a lower mold according to an embodiment in the present disclosure. FIG. 4 is a view illustrating a leveling plate according to an embodiment in the present disclosure.

As illustrated in FIGS. 1 to 4, an apparatus for manufacturing a permanent magnet according to the present disclosure includes a lower mold 100 for accommodating a plurality of permanent magnet blocks 10, an upper mold 200 for pressing the upper surfaces of the permanent magnet blocks 10, and an adhesive recirculation unit 300 which recirculates adhesive in the lower mold 100.

The lower mold 100 has an inner space 110 formed therein such that the permanent magnet blocks 10 having the same size may be accommodated in the inner space 110, and has an enclosed shape that is opened at the upper surface thereof such that the upper mold 200 may be inserted into the lower mold 100.

In addition, the lower mold 100 has one or more adhesive collection holes 120 formed on a bottom thereof such that the adhesive accommodated in the lower mold 100 may be discharged through the adhesive collection holes 120. The adhesive recirculation unit 300 is installed to the bottom of the lower mold 100 so as to introduce the adhesive through adhesive collection holes 120.

The upper mold 200 is vertically movably installed above the lower mold 100 by a cylinder or the like, and has a space for accommodating the adhesive therein. The upper mold 200 has a plurality of adhesive spray holes 210 spaced at regular intervals on the bottom thereof such that the adhesive may be sprayed to the permanent magnet blocks 10 accommodated in the lower mold 100.

The adhesive recirculation unit 300 is connected to the upper mold 200 through an adhesive passage 310 to circulate the adhesive by supplying the adhesive introduced through the adhesive collection holes 120 into the upper mold 200 through the adhesive passage 310.

The adhesive passage 310 may be made of a flexible material so as not to affect vertical movement of the upper mold 200.

The bonding force between the permanent magnet blocks 10 is increased by evenly applying the adhesive to the surface of each permanent magnet block 10, thereby improving the durability and performance of a produced permanent magnet assembly.

Each of the adhesive spray holes 210 formed on the bottom of the upper mold 200 may have a diameter of 40 to 60 µm.

If the diameter of the adhesive spray hole 210 is less than 40 µm, the adhesive may not smoothly circulate since a large quantity of energy is consumed to spray the adhesive and it takes a relatively long period of time to discharge the adhesive. If the diameter of the adhesive spray hole 210 exceeds 60 μm, the adhesive may be discharged to outside during moving in the upper mold 200 since the adhesive is easily discharged through the adhesive spray holes 210, thereby increasing the consumption amount of adhesive and increasing manufacturing costs. Therefore, the adhesive spray hole 210 has a diameter of 40 to 60 μm.

In addition, the lower and upper molds 100 and 200 according to the present disclosure may be made of a rubber material. This is because when external force is applied to the sides and bottoms of the upper and lower molds 200 and 100, the permanent magnet blocks 10 accommodated in the lower mold 100 are uniformly deformed in all directions such that the same pressure is supplied to the permanent magnet blocks 10 in all directions thereof.

The apparatus for manufacturing a permanent magnet according to the present disclosure may further include a leveling plate 400 disposed between the upper mold 200 and the lower mold 100 and inserted into the lower mold 100.

The leveling plate 400 has a plate shape and includes a plurality of adhesive flow holes 410. When the upper mold 200 presses the plane surface of the leveling plate 400 and presses the upper surfaces of the permanent magnet blocks 10 accommodated in the lower mold 100, flatness of the produced product may be improved.

Hereinafter, a method for manufacturing a permanent magnet according to an embodiment in the present disclosure will be described with reference to the drawings.

FIG. 5 is a flowchart illustrating a method for manufacturing a permanent magnet according to an embodiment in the present disclosure.

As illustrated in FIG. 5, a method for manufacturing a permanent magnet includes a preparation process of preparing the plurality of permanent magnet blocks 10, an insertion process of arranging the permanent magnet blocks 10 in the lower mold 100, a bonding process of bonding and integrating the permanent magnet blocks 10 while circulating the adhesive accommodated in the lower mold 100, and a heat treatment process of hardening the adhesive.

In the preparation process, the permanent magnet blocks 10 may have the same size and shape.

If the permanent magnet blocks 10 have different sizes and shapes, is impossible to secure flatness when a permanent magnet assembly is manufactured by bonding the permanent magnet blocks 10. In this case, since a separate process is required, man-hour may increase.

When the permanent magnet blocks 10 having the same shape are prepared, the permanent magnet blocks 10 are vertically or horizontally spaced apart from each other by a predetermined distance, and are arranged in the inner space 110 of the lower mold 100 in the insertion process.

The method for manufacturing a permanent magnet according to the present disclosure may further include a post-treatment process of applying the adhesive to the inner wall of the lower mold 100 after the insertion process.

Accordingly, since the adhesive is evenly applied to each surface of the permanent magnet blocks 10 and the bonding strength between the permanent magnet blocks 10 is improved, it is possible to simultaneously improve the durability and corrosion resistance of the produced product.

Next, the adhesive accommodated in an upper mold 200 is sprayed onto the surfaces of the permanent magnet blocks 10 through the adhesive spray holes 210 formed on the bottom of the upper mold 200 so as to be applied to the surfaces of the permanent magnet blocks 10 while the upper mold 200 presses the upper surfaces of the permanent magnet blocks 10 by moving downward toward the lower mold 100 accommodating the permanent magnet blocks 10.

The upper mold 200 has an enclosed shape and is made of a rubber material, and has a plurality of adhesive spray holes 210 formed on the bottom thereof such that the adhesive may be discharged through the adhesive spray holes 210. Accordingly, when the upper mold 200 is pressed, the liquid adhesive accommodated therein is supplied into the lower mold 100 through the adhesive spray holes 210.

In the bonding process, a permanent magnet assembly is manufactured in such a way to press the permanent magnet blocks 10 at the same pressure in all directions while supplying the adhesive into the lower mold 100.

The method for manufacturing a permanent magnet according to the present disclosure may further include a leveling process of arranging the leveling plate 400 between the upper mold 200 and the lower mold 100, and leveling the, permanent magnet blocks 10 accommodated in the lower mold 100 by pressing the upper surface of the leveling plate 400 using the upper mold 200, in order to improve flatness of the produced permanent magnet.

The leveling plate 400 may have a smaller area than the cross-sectional area of the lower mold 100 and have a plate shape having certain flatness, such that the leveling plate 400 may be inserted through the opened upper surface of the lower mold 100.

When the leveling process is completed, the permanent magnet blocks 10 are pressed at the same pressure from outer surfaces of the upper and lower molds 200 and 100 so as to be bonded to each other, thereby forming the permanent magnet assembly.

In the bonding process according to the present disclosure, the permanent magnet blocks 10 may be pressed while the adhesive circulates by an adhesive recirculation unit 504 such that the adhesive applied to the surfaces of the permanent magnet blocks 10 has a thickness of 10 to 50 μm.

If the thickness of the adhesive coated on the surfaces of the permanent magnet blocks 10 is less than 10 bonding strength of the assembly may decrease and a corrosion resistance thereof may be deteriorated. If the thickness of the adhesive exceeds 50 μm, magnetism of the product may be deteriorated since the adhesive is excessively thick.

That is, when the adhesive is collected through adhesive collection holes 120 formed on the bottom of the lower mold 100 to be supplied to the upper mold 200 using the adhesive recirculation unit 300 and then supplied again into the lower mold 100 through the adhesive spray hold 210 in the upper mold 200, it is possible to minimize waste of adhesive and uniformly form the thickness of the adhesive applied to the surfaces of the permanent magnet blocks 10. Consequently, it is possible to improve durability and performance of the produced product.

In the bonding process according to the present disclosure, the adhesive may be supplied and circulated until the amount of adhesive inserted into the lower mold 100 becomes 10 to 30% of the volume of the inner space 110 formed in the lower mold 100.

If the amount of adhesive is less than 10% of the volume of the inner space 110 formed in the lower mold 100, the bonding strength of the permanent magnet may be poor since the adhesive is not evenly applied to the surface of each permanent magnet block 10 or the corrosion resistance of the permanent magnet may be deteriorated since it is not smoothly coated. If the amount of adhesive exceeds 30% of the volume, manufacturing costs may increase due to the waste of adhesive and the magnetism of the produced product may be deteriorated since the adhesive applied to the surface of the permanent magnet block 10 is excessively thick.

In addition, after the bonding process is completed, the collected adhesive may be filled in the upper mold 200 and be reused in the following processes.

Accordingly, the corrosion resistance and performance of the produced permanent magnet can be improved by evenly coating the adhesive on the surface of each permanent magnet block 10 while minimizing the used amount of adhesive.

Here, the adhesive recirculation unit 300 may include a pump, a tank, etc., such that the adhesive accommodated in the lower mold 100 may be introduced through the adhesive collection holes 120 to be stored therein or may be recirculated into the lower mold 100 through the adhesive spray holes 210.

When the bonding process is completed, the permanent magnet is manufactured by heating the permanent magnet assembly and hardening the adhesive therein in the heat treatment process.

The temperature and time in the heat treatment process are selected according to types of used adhesive. In the present disclosure, an epoxy adhesive is used as the adhesive, and the permanent magnet is manufacture by heating the permanent magnet assembly and hardening the adhesive used therefor at a temperature of 150° C. for an hour.

Although the exemplary embodiments have been disclosed for illustrative purposes, those skilled in the art will appreciate that various modifications, additions, and substitutions are possible, without departing from the scope and spirit of the invention as disclosed in the accompanying claims.

What is claimed is:

1. A method for manufacturing a permanent magnet, comprising steps of:
    preparing a plurality of permanent magnet blocks having the same size;
    spacing and arranging the plurality of permanent magnet blocks in a lower mold which has an opened upper side;
    pressing a side of the lower mold while circulating adhesive in the lower mold by an adhesive recirculation unit and integrating the plurality of permanent magnet blocks such that the adhesive is evenly applied to a surface of each of the plurality of permanent magnet blocks, thereby forming a permanent magnet assembly; and
    hardening the adhesive by heating the permanent magnet assembly,
    wherein the step of pressing the side of the lower mold comprises pressing upper surfaces of the plurality of permanent magnet blocks by an upper mold configured to be movable downward toward the lower mold such that the adhesive accommodated in the lower mold is introduced to the adhesive recirculation unit and flows back to the upper mold by the adhesive recirculation unit.

2. The method according to claim 1, wherein the step of pressing the side of the lower mold comprises:
    arranging a leveling plate on the opening upper side of the lower mold; and
    pressing the leveling plate using the upper mold to level the plurality of permanent magnet blocks.

3. The method according to claim 2, wherein the lower mold has an adhesive collection hole formed on a bottom side of the lower mold and the upper mold has a plurality of adhesive spray holes formed on a bottom side of the upper mold thereof, such that the adhesive accommodated in the upper mold is sprayed through the adhesive spray holes, and
    wherein in the step of pressing the side of the lower mold, the plurality of permanent magnet blocks are integrated while the adhesive in the lower mold is introduced through the adhesive collection hole and flows back to the upper mold through an adhesive passage.

4. The method according to claim 3, wherein, in the step of pressing the side of the lower mold, the adhesive circulates such that a bonding layer on each of the plurality of permanent magnet blocks has a thickness of 10 μm to 50 μm.

5. The method according to claim 3, wherein each of the upper and lower molds is made of a rubber material, and
    wherein in the step of pressing the side of the lower mold, the same force is applied to each of the plurality of permanent magnet blocks in all directions.

6. The method according to claim 1, further comprising, before the step of spacing and arranging the plurality of permanent magnet blocks, applying the adhesive to an inner wall of the lower mold.

7. The method according to claim 1, wherein the adhesive is a thermosetting resin.

8. The method according to claim 3, wherein the adhesive passage is connected between the upper mold and the lower mold.

9. An apparatus for manufacturing a permanent magnet, comprising:
    a lower mold having an inner space in which a plurality of permanent magnet blocks are disposed, having an enclosed shape that is opened at an upper side of the lower mold, and having an adhesive collection hole formed on a bottom side of the lower mold;
    an upper mold vertically movably disposed above the lower mold, adhesive being sprayed to the inner space of the lower mold through a plurality of adhesive spray holes formed on a bottom side of the upper mold in which the upper mold is inserted through the opened upper side of the lower mold and presses upper surfaces of the plurality of permanent magnet blocks; and
    an adhesive recirculation unit attached on the bottom side of the lower mold and configured to have the adhesive accommodated in the lower mold introduced through the adhesive collection hole to the adhesive recirculation unit and flowed back to the upper mold through an adhesive passage.

10. The apparatus according to claim 9, wherein each of the upper and lower molds is made of a rubber material such that the same force is applied to the plurality of permanent magnet blocks in all directions.

11. The apparatus according to claim 9, wherein each of the adhesive spray holes has a diameter of 40 μm to 60 μm.

12. The apparatus according to claim 9, further comprising a leveling plate inserted through the opened upper side of the lower mold and having a plurality of adhesive flow holes such that the adhesive flows through the adhesive flow holes.

13. The apparatus according to claim 12, wherein the adhesive passage is connected between the upper mold and the adhesive recirculation unit.

14. The apparatus according to claim 13, wherein the lower mold has one or more adhesive collection holes formed on the bottom side thereof such that the adhesive accommodated in the lower mold is discharged through the adhesive collection holes, and
    wherein the adhesive flows through adhesive collection holes.

15. The apparatus according to claim 14, wherein the one or more adhesive collection holes have a diameter bigger than each of the plurality of adhesive flow holes.

* * * * *